United States Patent Office 2,700,554
Patented Jan. 25, 1955

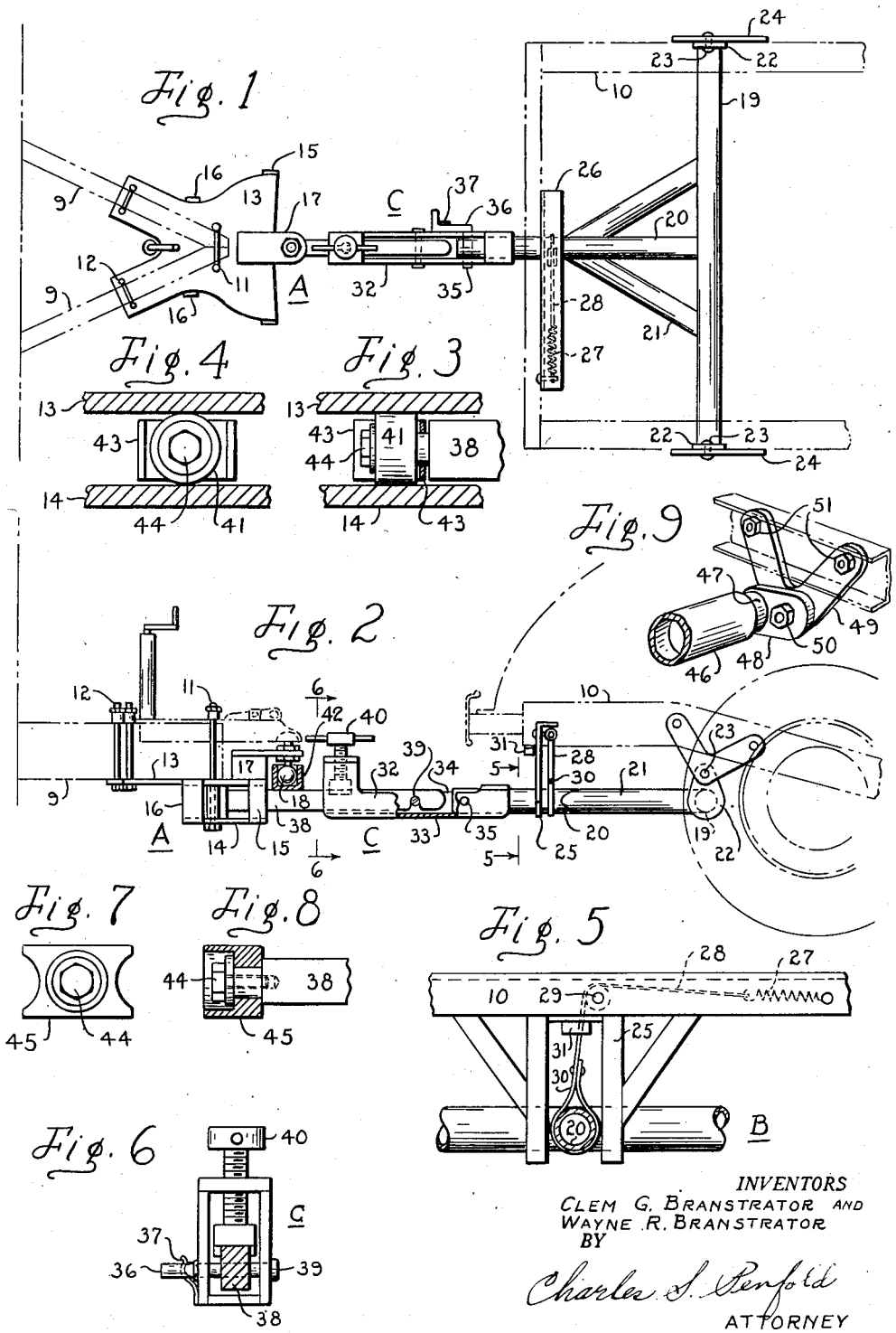

2,700,554

MOTORCAR HITCH FOR TRAILERS

Clem G. Branstrator and Wayne R. Branstrator, Fort Wayne, Ind.

Application February 5, 1951, Serial No. 209,332

4 Claims. (Cl. 280—494)

This invention relates to improvements in a motor-car hitch for a trailer, one object thereof being to provide a novel coupling or hitch for detachably connecting the body frame support of a trailer with the body frame of an automotive vehicle or car, so constructed and arranged that the weight of the forward extremity of the trailer and the hitch is borne by the body frame of the car.

An important object of the invention is to provide a unique coupling which serves to promote safe driving by stabilizing and controlling, within practicable limits, any abnormal condition of movement which may occur between the car and trailer while they are traveling on a roadbed. More particularly in this regard, the coupling and parts associated therewith are designed and constructed to prevent pitching or nosediving of the trailer and also surging, which gives the feeling that the car is being alternately pushed and pulled.

A significant object of the invention is to provide a coupling assembly which is connected in an underslung position with respect to a car and trailer in order to distribute and balance some of the load of the trailer onto the car in such a manner that the forward movement of the trailer will correspond to that of the car.

A particular object of the invention is to provide a novel coupling assembly having as a component a supporting frame adapted for pivotal connection with a car and improved means for guiding and supporting a part of the frame.

Another object of the invention is to provide a unique method of connecting fittings to the supporting frame to facilitate installation of the supporting frame in a car.

Another object of the invention is to provide a safe coupling for connecting a trailer to a car by which is facilitated the operations of coupling and uncoupling the car and the trailer, and which permits some lateral movement relatively with respect to the trailer and car without undue longitudinal play therebetween.

The invention also has as an object the provision of a tongue and a coupler constituting components of the coupling which are so constructed and arranged that the tongue is actually held attached to the trailer when the coupler is connected to the tongue and supporting frame.

Additional objects of the invention reside in its economy of construction and assembly, efficiency in adjustment and operation, strength, stability and durability.

And a further object of the invention is to construct the coupling members, so that when the car is disconnected from the trailer, the coupling parts that remain attached to the car are substantially concealed from view.

Other objects and advantages of the invention appear in the following description.

An illustrative embodiment of the invention is shown in the accompanying drawings, in which:

Figure 1 is a fragmentary top plan view showing the construction of the hitch mechanism;

Figure 2 is a side elevational view projected from Figure 1;

Figure 3 is an enlarged detail view showing a central longitudinal section of a roller bearing and supporting means therefor;

Figure 4 is a similar view showing a transverse section of the structure shown in Figure 3;

Figure 5 is a fragmentary rear end view of a car, the stem of the draft-frame of the coupler mechanism being shown in section on the line 5—5 of Figure 2;

Figure 6 is a rear end elevational view of a connecting frame for the hitch and a coupling tongue or link shown in section on the line 6—6 of Figure 2;

Figures 7 and 8 show a modification of the structure shown in Figures 3 and 4; and Figure 9 is a perspective view of a modified construction that may be utilized in connecting the draft-frame to a vehicle.

The illustrative embodiment of the invention comprises a coupling mechanism adapted for attachment to frame members 9 of a trailer and a car 10, both of standard or conventional construction.

This application is a continuation-in-part of an application Serial Number 96,746, filed June 2, 1949, now abandoned.

In the subject invention there is included a housing or supporting assembly, indicated generally by letter A, that is secured to the bottom of the trailer frame members 9 by means of a center bolt 11 common to both members and bolts 12 attached to each member. The housing has horizontally disposed top and bottom planar bearing plates 13 and 14, respectively, that are held in spaced apart parallel relation by side members 15 and 16. A bracket 17 is secured on the forward projecting end portion of the top plate 13 and has bolted thereon a spherical pivot member 18, hereinafter referred to, that overhangs the forward end of the housing.

The hitch or coupling also includes a generally T-shaped draft-frame, indicated by letter B, preferably made of tubing, that has an axle or cross-member 19, a rearwardly extending rod or stem 20 and angular braces 21 connecting the axle and rod. This draft-frame supports a coupler or socket which will be hereinafter referred to. The ends of the axle 19 have secured thereon upwardly extending links or ears 22 that are pivotally connected as indicated at 23 to corresponding brackets 24 attached to the outer sides of the side rails of the chassis frame of the car. This arrangement distributes the load of the trailer at appropriate locations about as far forward with respect to the car that is practical in order to afford a well balanced assembly contributive to good driving.

A guide assembly 25 is provided for the stem 20 and is secured to the rear end of the chassis frame. It includes spaced bars extending downwardly astride the rod 20 of the draft-frame. The guide assembly 25 has a horizontal flange 26 on its top and has secured thereto beneath the flange a helical tension spring 27, having connected therewith a cable 28 that extends over a pulley 29 on the guide assembly. This cable is provided with a stirrup 30 through which the rod 20 of the draft-frame extends. By this means downward movement of the rod relative to the chassis frame is resisted by tension of the spring. A bumper 31 on the bottom of the chassis frame serves to limit upward movement of the rod.

The hitch includes a coupler, or socket member, indicated generally by the letter C, which consists of a generally channel shaped body having side walls 32, a bottom wall 33, and the upper midportion of the body is formed to provide an elongated clearance slot or opening 34. The forward end of the coupler C is telescopically connected with the rod 20 of the draft-frame and is secured thereto by a removable pin 35. One end of this pin has a handle 36 thereon that is held in place by a latch spring 37, to prevent accidental dislodgment.

Another component or member of the hitch includes a tongue or link 38 one end of which extends forwardly into the coupler C. The tongue is provided with a notch which receives a transverse abutment or pin 39 on the coupler. A locking device preferably in the form of a hand operated clamp-screw 40 is mounted on the rear upturned end portion of the coupler and is provided with a fitting which embraces the upper portion of the tongue as shown in Figure 6. The screw serves to lock the coupler to the tongue.

The rear end of the tongue or link 38 is provided with bearing means preferably in the form of a roller 41 disposed between the top and bottom bearing plates 13 and 14 of the supporting assembly A for rolling engagement with the opposed parallel surfaces of the plates. This roller serves as a stabilizing element. A socket 42 is secured to the tongue and receives the spherical pivot member 18 for pivotally connecting the tongue to the supporting assembly. After the coupler C is removed from the tongue, the tongue, if so desired, can be detached from the supporting assembly or carrier A by swinging the tongue to an extreme left or right position and then pushing downwardly to release the pivot 18 from the socket 42 whereupon the tongue can be pulled outwardly and free of the carrier. It will thus be manifest that the tongue is actually held attached with the carrier only when also operatively connected with the coupler C, and the latter is connected with the rod 20. The assembly A thus constitutes a carrier for the tongue.

As pointed out above, a specific object of the invention is to protect the roller 41. This is preferably accomplished by utilizing a U-shaped shield 43 which is arranged astride the roller 41 and between the top and bottom plates of the housing or supporting assembly A. The roller and shield are secured in operative position by a bolt 44 that extends through the roller, base wall of the shield and into the end of the tongue or link. The roller is thus protected from loose stones and other foreign matter that by chance may enter the housing.

If so desired, a shoe 45, shown in Figures 7 and 8, may be substituted for the roller shown in Figures 3 and 4, in which instance the shoe is mounted on the bolt 44 in the same manner as the roller. The shoe when disposed between the top and bottom plates 13 and 14 slidably engages the opposed parallel bearing surfaces of the plates when the tongue pivots relative to the housing.

Another attribute of the invention, above alluded to, is the fact that the coupling or hitch is underslung with respect to the trailer frame and the frame of the car 10 when installed and in operating position, and permits lateral movement of the trailer because of its pivotal support on the tongue or link and movement of the roller or shoe in the housing, and due to the hinged connections between the draft-frame and the car frame, the pull of the car on the trailer is maintained in a direct line. The openings in the rod or stem through which the pin 35 extends are sufficiently large as to permit a little rotative play between the rod and coupler, thus to avoid torsional strain when the car or the trailer is laterally tilted, one relative to the other. This straight through relatively rigid connection between the tongue and draft-frame reduces tilting to a minimum and substantially prevents nosediving, pitching and surging, and any other abnormal condition.

In Figure 9 of the drawing there is illustrated a construction for facilitating installation of the draft-frame in cars of different models and makes. This construction includes a tubular axle 46, a solid cylindrical insert 47 arranged in the end of the axle, a link 48 anchored to the insert, and a hanger 49 pivotally connected to the link by a bolt 50. The hanger is attached to the side rail of a chassis frame by bolts 51. Obviously, a pair of inserts, hangers and links are employed. The axle and inserts are so constructed and arranged that the inserts can be adjusted rotatably and/or longitudinally with respect to the axle and then welded or otherwise secured to the axle. With this unique method of assembly, the draft-frame can be supported forwardly or rearwardly at different elevations by readily securing the inserts in various rotative positions and by moving the inserts inwardly and outwardly, and securing them in place, the length of the axle may be expeditiously changed to suit various installation requirements.

The hitch can be readily uncoupled by unlatching and removing the pin 35 so that when the car is moved forward freeing the rod 20 from the coupler C, the rod will be caused by the spring 27 to automatically swing upwardly in an out of the way position concealing the draft-frame substantially from view. After this uncoupling operation, if so desired, the coupler C may readily be removed from its connection with the link by manipulating the clamp-screw in a direction to permit unhooking of the tongue from the pin 39, and then withdrawal of the coupler from the tongue.

The coupling operation is accomplished readily by replacing and securing the coupler C on the tongue, swinging the draft-frame downwardly to align the rod with the coupler, backing the car to insert the rod into the coupler, and then replacing the pin 35 into the coupler and rod to complete connection between the coupler and rod.

Variations from the particular construction above disclosed may be resorted to by the exercise of skill in the art, without departure from the spirit or scope of the invention.

What we claim is:

1. A hitch for detachably connecting a motor-car and trailer, consisting of a housing secured to the forward end of the trailer frame and provided with a spherical pivot member, said housing having horizontal top and bottom plates spaced apart, a link having thereon a socket in which said member bears and provided with a roller on its rear end disposed between said plates, a draft-frame pivotally mounted in connection with a motor-car frame for vertical swinging movement and provided with a stem, a coupler the opposite ends of which telescope respectively the stem of said draft-frame and said link, said coupler being provided with a clamp-screw at its rear end engaging said link whereby to secure the link and coupler together and a locking pin between the ends of the coupler engaged in a notch in said link, a removable pin securing the coupler and stem in place, and a tension means to elevate the draft-frame.

2. A detachable hitch for a motor-car having a frame and a trailer having a frame, said hitch comprising a housing secured to the trailer frame and provided with a pivot member, a link having bearing contact with said pivot member, a roller on the link disposed in the housing, a coupler removably locked in connection with said link, a draft-frame pivotally mounted in connection with a motor-car frame for vertical swinging movement provided with a stem removably secured in said coupler opposite said link, and a tension means on the frame of said motor-car having operative connection with said draft-frame to elevate it when disconnected from the coupler.

3. A hitch for detachably connecting a car and trailer, comprising a supporting assembly secured to the forward end of the trailer frame, said assembly having horizontal spaced apart bearing means, a link pivotally connected to the assembly and provided with a stabilizing element on its rear end disposed between said bearing means, a draft-frame pivotally mounted on a car for vertical swinging movement, a rod on said draft-frame, a coupler the opposite ends of which respectively telescopically receive the rod and said link, said coupler being provided with means for securing the link and coupler together, removable means securing the coupler and rod in place, and a tension means to elevate the draft-frame.

4. A coupler for connecting a pair of coupling components comprising an elongated channel-like body provided with a first socket at one end and a second socket at its other end, means carried by the first socket for securing a first coupling component therein, abutment means provided in the second socket, said body being provided with an opening adjacent the abutment means, the relationship and size of the second socket, abutment means and opening being such that when a second coupling component is inserted into the second socket for connection with the abutment means the opening will provide clearance for the second component to effect such connection, and locking means carried by the second socket for locking a second component in the socket when connected with said abutment means.

References Cited in the file of this patent

UNITED STATES PATENTS

| | | |
|---|---|---|
| 1,321,714 | Carlson | Nov. 11, 1919 |
| 1,713,331 | Davis | May 14, 1929 |
| 2,452,710 | Allen | Nov. 2, 1948 |
| 2,471,636 | Martin | May 31, 1949 |
| 2,474,296 | Wiltsee | June 28, 1949 |
| 2,577,145 | Nearing et al. | Dec. 4, 1951 |